J. W. Bliss,
Clothes Line,

No. 64,063. Patented Apr. 23, 1867.

Witnesses:
Edw. F. Brown
Jno. Kingdon

Inventor:
Jeremy. W. Bliss

United States Patent Office.

JEREMY W. BLISS, OF HARTFORD, CONNECTICUT.

Letters Patent No. 64,063, dated April 23, 1867.

IMPROVED CLOTHES LINE.

*The Schedule referred to in these Letters Patent and making part of the same.*

TO ALL WHOM IT MAY CONCERN:

Be it known that I, JEREMY W. BLISS, of the city and county of Hartford, and State of Connecticut, have invented certain new and useful improvement in the manufacture of Clothes Lines for hanging clothes for drying; and I do hereby declare that I believe the same to be fully described hereinafter, so as to enable others skilled in the art to make and use the same therefrom, reference being had to the letters marked on the drawing, which indicate like parts in each of the figures.

Figure 1:
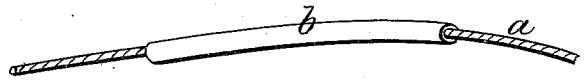
Figure 1 shows a vegetable cord or line covered with a gum coating.
Figure 2:
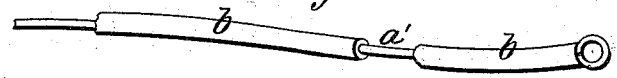
Figure 2 shows or represents a metallic wire covered or coated with a gum coating or material.
Figure 3:
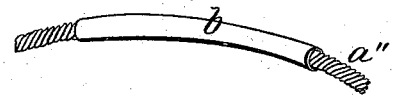
Figure 3 represents strands of metallic wire twisted together to form a cord or line having a coating of gum material thereon.

$a$ is a vegetable cord or line. $a'$ is a straight metal wire. $a''$ are strands of metal wire twisted together to form a line. $b$ represents a coating of gum or other suitable material upon the surface of the lines $a\ a'\ a''$.

The nature of this invention consists in applying a coat of gum or other suitable material upon the outer surface of a line composed of animal, vegetable, or metallic material, for the purpose of protecting the line from the weather, as an improved article of manufacture, use, and trade.

In the manufacture of this improved clothes line for hanging clothes for drying I propose to apply the gum coating to the line while the gum is in a fluid or plastic state, by the process (practised by manufacturers of India-rubber goods) in common use. By the use of this improvement, the line once fixed in place for use, may remain fixed without fear of injury from the weather, and thus always be in readiness for use, the advantages of which are believed to be obvious.

What I claim, and desire to secure by Letters Patent, is—

A clothes line of cord, leather, or wire, coated with India rubber or gutta percha, to protect the same from the weather, all as and for the purpose specified.

JEREMY W. BLISS. [L. S.]

Witnesses:
    EDM. F. BROWN,
    JOHN KINGDON.